United States Patent [19]
Jones

[11] 3,920,412
[45] Nov. 18, 1975

[54] HARD-SURFACED CASTINGS AND METHOD OF PRODUCING THE SAME

[75] Inventor: Charles Jones, Hillsdale, N.J.

[73] Assignee: Curtiss-Wright Corporation, Wood-Ridge, N.J.

[22] Filed: Oct. 7, 1974

[21] Appl. No.: 512,412

Related U.S. Application Data

[62] Division of Ser. No. 373,514, June 25, 1973, Pat. No. 3,878,880.

[52] U.S. Cl. .................................. 29/195; 29/191
[51] Int. Cl.² ........................................ B32B 15/04
[58] Field of Search ...... 29/195 A, 197, 197.5, 198; 164/9, 33, 46, 99

[56] References Cited
UNITED STATES PATENTS

| | | | |
|---|---|---|---|
| 3,539,192 | 11/1970 | Prasse | 277/224 |
| 3,552,939 | 1/1971 | Darnell et al. | 29/195 |
| 3,556,747 | 1/1971 | Hyde et al. | 29/198 |
| 3,574,570 | 4/1971 | Gwyn | 29/197.5 |

*Primary Examiner*—L. Dewayne Rutledge
*Assistant Examiner*—E. L. Weise
*Attorney, Agent, or Firm*—Raymond P. Wallace; Victor D. Behn

[57] ABSTRACT

A method of producing a casting of a basis metal having a transplanted facing of a very hard material. Hard facing materials such as refractory metals and cemented carbides are sprayed by a metalizing gun in a layer onto a core piece, an intermediate layer of metal is then sprayed onto the first layer to protect the brittle hard facing material from the thermal shock of casting temperatures, the core piece positioned in a mold as at least a portion of the cavity wall thereof, and a casting formed against and interlocking with the intermediate layer. The casting and core piece are removed from the mold and the core piece detached from the casting, leaving the first layer as an integral part of the casting having a hard surface.

10 Claims, 3 Drawing Figures

HARD-SURFACED CASTINGS AND METHOD OF PRODUCING THE SAME

This application is a division of copending application Ser. No. 373,514, filed June 25, 1973, now U.S. Pat. No. 3,878,880.

BACKGROUND OF THE INVENTION

This invention relates to a method of producing cast objects, and more particularly to a method of producing such articles of a basis metal having at least a portion of the surface thereof coated with a transplanted hard material.

It is known in the prior art to provide a metal object with a coating of another metal, usually harder and more resistant to wear, by flame spraying a layer of the coating metal on the basis metal and then finishing the surface layer to whatever degree of smoothness is required. This procedure works well when the coating layer is not too hard to respond readily to ordinary machining techniques for finishing. It has also been employed with very hard facing materials such as cemented tungsten carbide, titanium carbide, silicon carbide, and other similar materials. However, such hard facings require grinding and honing to produce a smooth finish, which is an expensive procedure. Further, in order to have sufficient facing material to reduce to the desired surface, a considerable thickness must be sprayed on, of which a large proportion is subsequently ground off and is therefore wasted. Since these materials are expensive in themselves, it follows that articles produced by this means have a very high cost.

Transplanted coatings are also known, such as the steel cylinder sleeves installed in aluminum alloy engine blocks by the method disclosed in U.S. Pat. No. 3,083,424. In that patent, a cylindrical mandrel is sprayed with a coating of steel by a metalizing gun, the mandrel carrying the coating is then positioned in a die casting mold, and the cylinder block then cast around it. The coating being rough on what constitutes its exterior surface before casting, the molten aluminum alloy when injected into the mold under pressure makes a firm bond with the coating material. The casting and the mandrel are then removed from the mold and cooled, after which the mandrel is released by differential expansion of the parts when the casting is heated. The steel layer then remains as a sleeve in the engine block, having a surface on its interior diameter comparable with that of the mandrel, and requiring only honing to serve satisfactorily as a cylinder bore.

Although that transplant process has been serviceable when the facing material is steel, it has proved inoperable with such materials as tungsten or a cemented carbide. Such materials are brittle and have a low coefficient of thermal expansion. When the molten metal of the casting shot is injected around them the thermal shock is such that the thin layer of material cracks and does not produce a serviceable facing.

It is an object of the present invention to provide a method of producing castings having facings of harder material than the basis metal.

It is another object to provide castings having transplanted coatings of very hard materials.

A further object is to provide a method of producing castings of relatively soft basis metals having wear surfaces of harder materials.

Another object is to provide a method of producing castings having transplanted coatings of refractory metals, cemented carbides, and other metalloid materials.

Still another object is to provide a method of casting a basis metal over a transplant coating which is protected from the thermal shock of molten metal by a protective layer.

Other objects and advantages will become apparent on reading the following specification in connection with the annexed drawing.

SUMMARY

This invention provides a method of making castings having transplanted coatings of hard metals and metalloid materials wherein the cracking of the transplant coating layer is avoided. The coating material is sprayed onto a mandrel or other core piece, then a protective layer of a metal having higher heat conductivity, high ductility, and a low modulus of elasticity is sprayed onto the coating material, forming a firm interlocking bond therewith. The core piece bearing the first and second layers is then positioned in a permanent mold and the casting formed, with the casting metal making a firm interlocking bond with the second layer. The heat of the casting metal is largely transferred rapidly away from the point or points of impingement on the second layer by the high thermal conductivity thereof, thus avoiding the production of an initial hot spot on the transplanted facing layer, which in the prior art has been a serious cause of cracking. The protective layer also has a thermal gradient across its thickness, and thus provides a small but significant delay before the full heat of the molten metal reaches the facing material, thus mitigating the thermal shock to the brittle facing material. This effect is enhanced by the fact that once in the mold the basis metal cools very rapidly, so that the facing material is never exposed to the full pouring temperature of the basis metal. Further, the low modulus of elasticity and associated high ductility of the protective layer allow it to bear local stresses without transferring them across the interface to the brittle facing layer, which has previously been a cause of cracking, owing to the low coefficient of expansion, the low thermal conductivity, and the low ductility of the facing material.

DESCRIPTION OF THE PREFERRED EMBODIMENTS

The invention will be described principally in terms of forming a peripheral housing for a rotary engine, with a transplanted coating on the inner running surface, but it is to be understood that it is applicable to producing any sort of castings having transplanted coatings of hard material.

Figure 1:
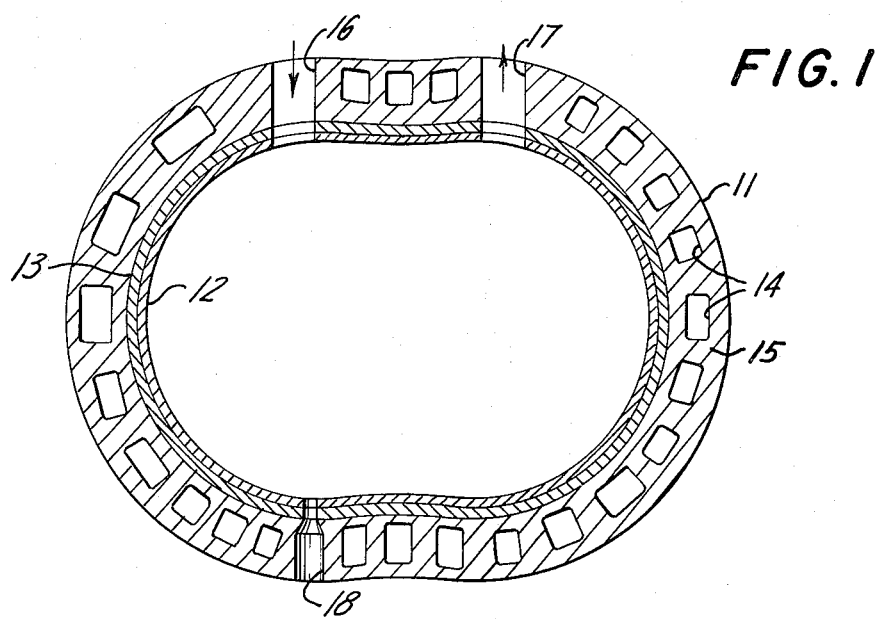
FIG. 1 is a cross-section of a peripheral housing for a trochoidal rotary engine, with its inner running surface having a transplanted coating according to the invention.

FIG. 1 shows a cross-section of such a peripheral housing 11, having a basically epitrochoidal inner surface bearing the hard facing 12 and the second layer 13 according to the invention. The housing 11 is formed of a cast aluminum alloy or other lightweight basis metal 15, and may have cooling passages 14, inlet and outlet passages 16 and 17 respectively, and a spark plug aperture 18, all of which openings are produced during the casting procedure by conventional coring techniques. Casting is carried out in a permanent mold, and the molten basis metal may be supplied by pressure feed, by pressure die-casting, or by centrifugal casting.

Figure 2:
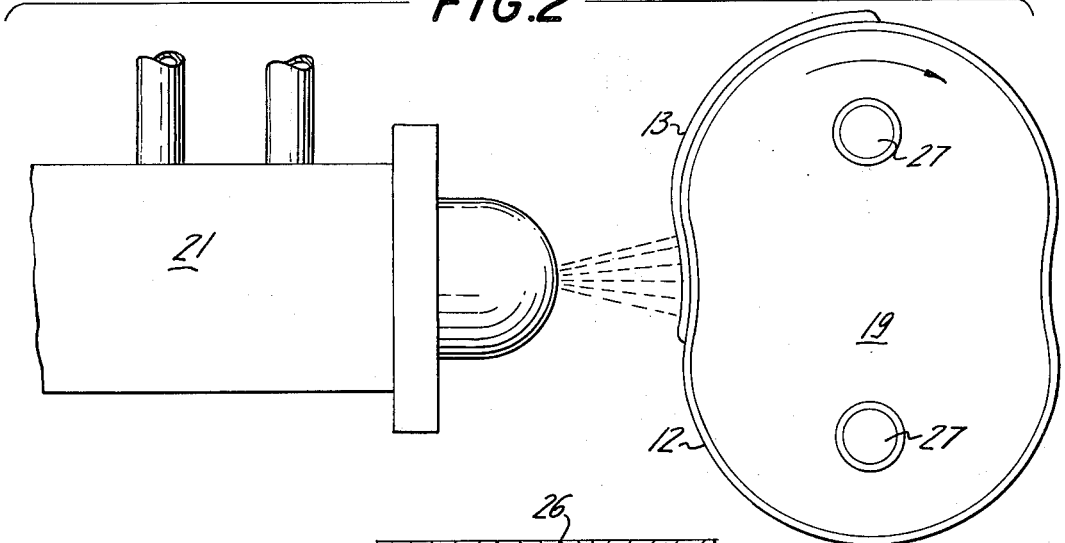
FIG. 2 is a semi-schematic view of a core piece in the course of being sprayed with the coating material and the protective layer.

In FIG. 2 there is shown a core piece 19 in the process of being sprayed with the hard facing layer 12 and the protective layer 13 by a metalizing gun 21. The core piece 19 is formed of a suitable die material by the usual toolmaking techniques, having a peripheral surface in the form of the trochoid which is desired in the casting. However, the core piece is not limited to any specific form nor to positioning a hard facing material only on an interior surface of a casting. As used herein the term core piece embraces any portion of a mold wall and may have any form appropriate to position the facing material at the intended place in the casting. Such a core piece may be of any shape, whether curved, plane, or angular, and will be so formed that its coated surface will form at least a portion of a wall of the mold in which the casting is to be formed, leaving the hard facing material at the desired position of the cast object. No draft allowance need by provided for such core pieces, since they may be removed from the final casting by other means.

In the case shown in FIG. 2 the core piece 19 has its peripheral surface accurately formed and highly finished, and is of a thickness equal to the axial dimension of the trochoidal housing to be cast, plus a sufficient excess of thickness to allow finish machining of the axial sides of the casting to plane surfaces. In the case of other articles it may occur that no such finishing allowance need be provided.

It may be convenient to give the surface of the core piece to be sprayed a coating of a release agent. Such release agents as are commonly used in permanent mold casting practice are satisfactory. Also, it has been found that if the core piece 19 is heated and sprayed with a fine mist of a saturated solution of sodium chloride a very thin coating of salt will be left thereon. The salt-coated core piece will then be sprayed with the hard facing material, and after the casting is formed the salt may be dissolved by immersing the casting bearing the core piece in water. Other inexpensive water soluble salts will also serve as release agents. The temperature to which the core piece is heated before salt spraying is not critical, except that it should be hot enough to produce more or less instant drying of the water mist solution so that there are no runs which would cause local variations of thickness of the salt. About 400°F has been found suitable.

Whether or not any release agent is used, the core piece 19 has its peripheral surface sprayed with a layer 12 of the material desired as a hard facing. Such material may be a hard metal, such as tungsten, cobalt, molybdenum, or high alloys of those metals; or it may be a material such as a metal carbide, for example the carbides of tungsten, cobalt, molybdenum, or silicon carried in a cementing metal such as cobalt, or titanium carbide in a matrix of steel.

A frequently used material for dispensing by metalizing guns comprises about 73 to about 88% tungsten carbide, preferably about 85 to 88%, with the remainder being cobalt as the cementing material. For convenience, all hard facing materials 12 applied by a metalizing gun in this invention, as listed above, will be referred to hereinafter as metalloid materials whether they are metals or carbides, and the materials of the protective second layer 13 will be designated as metal.

The core piece 19 is given a coating 12 of metalloid material of the thickness selected. The actual thickness may vary from one job to another, and may be just that thickness desired for service in the finished casting when the type of service is such as to require no finishing of the hard facing beyond the surface provided by the core piece. Otherwise, the coating 12 may be of sufficient thickness to allow removal of some amount of the metalloid material in a finishing process, such as honing or grinding, or grinding followed by honing. For the housing 11 the service thickness of the hard facing is to be from 0.002 to 0.006 inch after honing. Since the periphery of the core piece 19 is provided with a high finish, the coating 12 as sprayed is from about 0.003 to about 0.007 inch, as normal honing ordinarily removed no more than about 0.001 inch of material. For other types of uses, especially when the hard facing is to be ground, the allowance for removal in the sprayed coating may be greater. It will be understood that these parameters are given by way of example only, and may vary widely for other requirements.

The exterior surface of coating 12 as left by the metalizing gun is slightly pitted and irregular, having a distinct tooth. There is then sprayed upon it the protective layer of metal 13, which may be from three to twenty times as thick as the metalloid hard facing layer, preferably about 6 to 12 times as thick. The thickness selected still depend on several factors, such as the mass of metal to be cast around it, and the casting temperature of the basis metal; the melting point, thermal conductivity, and ductility of the metal of the protective layer; and the thermal conductivity, coefficient of thermal expansion, and resistance to thermal shock of the hard facing metalloid. The impact of the sprayed particles of protective metal 13 drives them into the irregularities of the surface of the metalloid coating 12, producing a firm interlocking bond of a strength equal to that of whichever of the two materials has the lesser strength.

The protective metal 13 generally has a melting point lower than that of the hard facing metalloid 12, but not lower than the melting point of the casting metal 15, and it may be higher than that of the casting metal. Metal 13 must also have higher thermal conductivity than the metalloid, greater ductility, and a lower modulus of elasticity.

All of the metalloid materials referred to above have high moduli of elasticity, low thermal conductivity, and very low coefficients of thermal expansion, with the expansion of pure cobalt, which is comparable with iron. However, tungsten carbide with cobalt as the cementing material is very low in all these characteristics, except modulus of elasticity. It is this relative inability to conduct heat and to expand which is responsible for the cracking of the metalloids when molten metal is cast in direct contact with them.

As used herein, the term aluminum family includes pure aluminum and alloys thereof containing 70% or more aluminum, and the term copper family includes pure copper and alloys thereof containing 70% or more copper. Both the aluminum family and the copper family are particularly suitable metals for the protective layer 13 when the casting 15 is to be formed of one of the usual lightweight casting metals, such as alloys of aluminum, magnesium, or zinc. The members of both the aluminum family and the copper family have thermal conductivities several times as high as those of the metalloids of hard facing 12, and hence are capable of carrying heat rapidly around the facing metalloid from the points of first contact of the casting metal. Further, there is a temperature gradient across the thickness of the protective layer 13, so that there is a slight delay before the heat from the casting metal reaches the hard facing layer. Thus there is more opportunity for the temperature to equalize throughout the facing material than would be the case if the casting metal were fed into direct contact with it. Also, the full molten temperature of the basis metal will not reach the hard facing metalloid, since the basis metal cools very rapidly in the mold.

The exterior surface of the protective layer 13 exposed to the mold cavity, as left by the metalizing gun, will be pitted and irregular just as that of the hard coating. The casting metal under the pressure of the mold feed therefore unites firmly with it to provide an interlocking bond of great strength. The melting point of the members of the copper family, although much below that of the metalloids, is nevertheless far above that of the casting metals, so that there is no danger of impairing the integrity of a protective layer from the copper firmly by the temperature of the molten basis metal.

When a member of the aluminum family is desired for the protective layer, a member may be chosen which has a melting point at least as high as, or a few degrees higher than, that of the basis metal. Pure aluminum, for instance, has a melting point of 660°C, whereas the common aluminum casting alloys melt at various lower temperatures. The melting points of the magnesium casting alloys are comparable with those of aluminum, and the melting points of the zinc casting alloys are very much lower. Further, even if the melting temperatures of the protective layer and the basis metal should be the same, the casting metal chills rapidly after being fed into the mold, and if the protective metal approached its melting point an additional input of heat would still be necessary to push it over the threshold of liquidus, which additional input would not be available.

Figure 3:
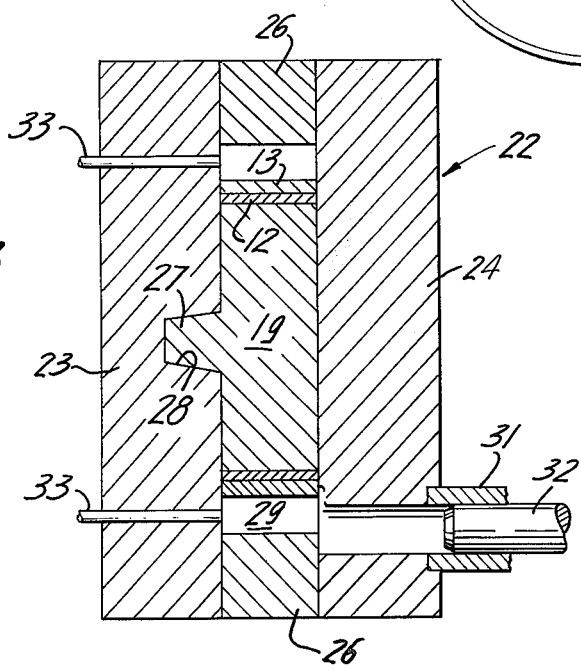
FIG. 3 is a semi-schematic view in cross-section of a closed casting mold with the core piece of FIG. 2 in position for casting.

In FIG. 3 there is shown semischematically a permanent mold assembly 22, which in the example shown is a pressure die-casting mold, but may also be a pressure-fed mold or a mold for centrifugal casting. The requisite pressure for urging the casting metal into a firm interlocking bond with the rough surface of the protective layer may be provided by any of these methods.

The mold 22 includes an ejector die portion 23, a cover die 24, and side pieces 26. The core piece 19 bearing its metalloid layer 12 and its protective layer 13 are shown in position for casting; layers 12 and 13 are shown with their thicknesses much exaggerated for clarity of illustration. Core piece 19 bears one or more extensions 27 fitting into sockets 28 in the ejector die to locate it. A mold cavity is thus formed between the core piece 19 and the other parts of the assembly. The die assembly has also a shot sleeve 31 communicating with the mold cavity and a ram 32 for injecting the molten casting metal. In other forms of permanent mold casting the corresponding feed means will be provided. Knockout pins 33 are provided for ejecting a completed casting.

With the mold 22 assembled and one or more core pieces 19, depending on the object to be cast, in position therein, the mold cavity is fed with molten basis metal and the casting is formed. The cooling of the lightweight casting metals, such as alloys of aluminum, magnesium, or zinc, is so rapid that the mold may be opened almost immediately after the casting shot, the time varying somewhat in accordance with the thickness of the heaviest section of the casting.

If the core piece bearing the hard facing is of simple form and not entirely surrounded by the casting it is sometimes possible to eject the casting with the core piece remaining in the mold, especially if a mold release was used on the core piece before depositing the metalloid coating. Otherwise, as in the example shown, the casting is ejected from the mold with the core piece retained in the casting, and allowed to cool. If the salt spary has been used on the core piece, the two parts may be immersed in water after cooling, where the salt will gradually dissolve and allow the core piece to be pulled free. However, this is a rather slow procedure, and it is desirable to make the core piece available as soon as possible for further casting. Once the part has cooled, a faster way of securing the core piece is to reheat the casting rapidly by application of heat to the outside, or to the side away from the core piece. Since the lightweight casting alloys have high coefficients of thermal expansion, the basis metal of the casting will soon expand enough to free its grip on the core piece, only a few thousandths of an inch being required.

The result is then a cast article having a hard facing of the selected metalloid material on the surface where wear will be experienced. The metalloid facing will be firmly united to the remainder of the casting as an integral part thereof, and its exposed surface will have a finish comparable to the finish provided on the core piece. Some additional light finishing operation may be performed, depending on the service to which the part is to be put.

Although the process of the invention has been described principally in connection with the production of a specific cast article, it will be appreciated that it can also be practiced on castings of other forms, for other uses. Also, the process is not limited to providing a hard facing on an interior surface, but may be employed to position hard facing material on an exterior surface. The term core piece as used herein may be any wall or portion of a wall of a permanent mold which is initially given the metalloid coating and the protective metal layer before forming the casting.

What is claimed is:

1. A pressure-cast article having at least a portion of its surface coated with a selected thickness of a hard facing material, wherein the improvement comprises:
   a. the hard facing material being a metalloid material selected from the group consisting of tungsten, cobalt, molybdenum, tungsten carbide, cobalt carbide, molybdenum carbide, silicon carbide and titanium carbide;
   b. a metallic layer underlying the hard facing, the underlying layer being from three to twenty times the thickness of the hard facing and being selected from the group consisting of the aluminum family and the copper family, the underlying layer being firmly united to the hard facing material;
   c. the body of the casting being a metal selected from the group consisting of alloys of aluminum, magnesium, and zinc, the metal of the body of the casting being firmly united to the underlying layer; and d. the hard facing, the underlying layer, and the body of the casting all being integral portions of the cast article.

2. The combination recited in claim 1, wherein the metal of the underlying layer is a member of the aluminum family.

3. The combination recited in claim 2, wherein the metalloid material is tungsten carbide.

4. The combination recited in claim 2, wherein the metalloid material is molybdenum carbide.

5. The combination recited in claim 2, wherein the metalloid material is silicon carbide.

6. The combination recited in claim 2, wherein the metalloid material is titanium carbide.

7. The combination recited in claim 1, wherein the metal of the underlying layer is a member of the copper family.

8. The combination recited in claim 7, wherein the metalloid material is tungsten carbide.

9. The combination recited in claim 7, wherein the metalloid material is molybdenum carbide.

10. The combination recited in claim 7, wherein the metalloid material is titanium carbide.

* * * * *